No. 869,173. PATENTED OCT. 22, 1907.
H. T. FOWLER.
NUT LOCK.
APPLICATION FILED JAN. 30, 1907.
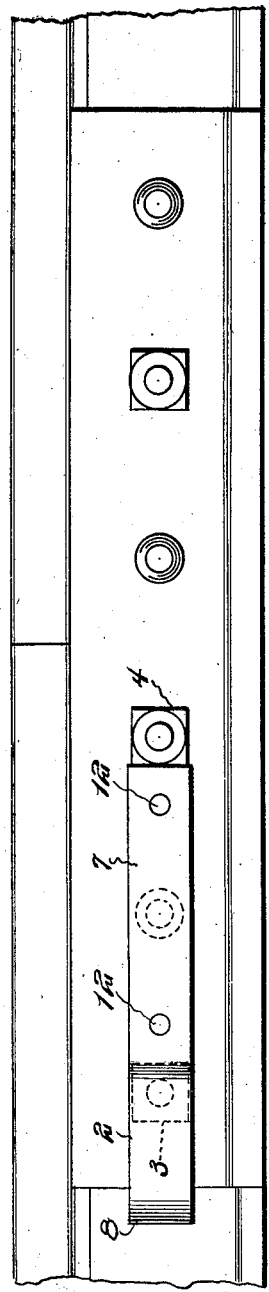
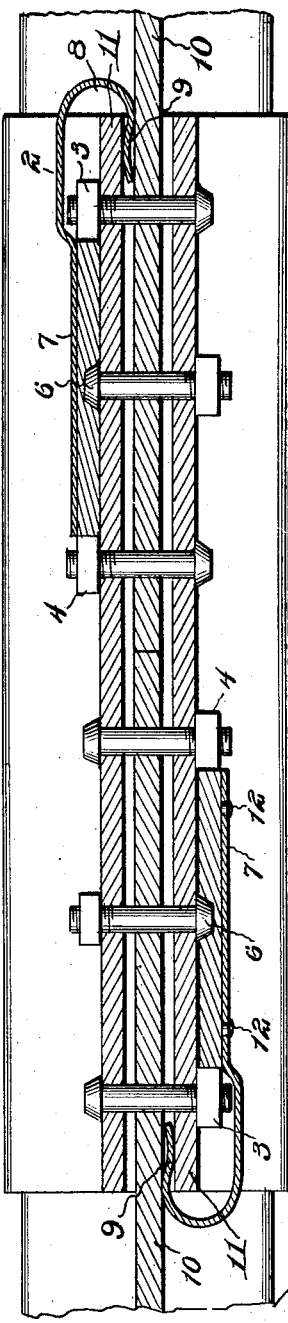
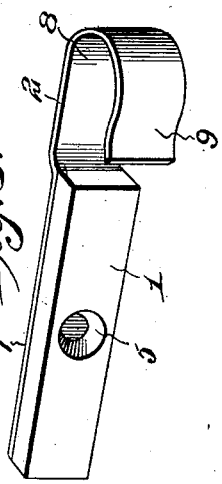
Witnesses
Louis R. Heinrichs
D. W. Gould
Inventor
Harvey T. Fowler
By Victor J. Evans
Attorney

UNITED STATES PATENT OFFICE.

HARVEY T. FOWLER, OF SCHELL CITY, MISSOURI.

NUT-LOCK.

No. 869,173.  Specification of Letters Patent.  Patented Oct. 22, 1907.

Application filed January 30, 1907. Serial No. 354,918.

*To all whom it may concern:*

Be it known that I, HARVEY T. FOWLER, a citizen of the United States, residing at Schell City, in the county of Vernon and State of Missouri, have invented new and useful Improvements in Nut-Locks, of which the following is a specification.

The invention relates to an improvement in nut locks, being directed particularly to a means whereby a series of the securing means used in the ordinary fish plate attachments may be held against accidental loosening.

The main object of the present invention is the production of a nut lock designed for application subsequent to the use of the usual fish plate securing means, and adapted when in place to absolutely prevent loosening of the bolts or nuts used in securing the fish plate in place.

The invention will be described in the following specification, reference being had particularly to the accompanying drawings, in which:—

Figure 1 is a view in side elevation illustrating the application of my improved nut lock. Fig. 2 is a central longitudinal section of the same, Fig. 3 is a perspective view of the nut lock detached.

The improved nut lock comprises a locking bar 1, and a spring holding member 2 designed for coöperation with the locking bar.

The bar 1 is of a thickness equal to or slightly exceeding the similar dimension of the securing nuts used on the fish plate bolts, and is of a length to fit snugly between the two succeeding nuts 3 and 4 immediately adjacent one end of the fish plate connection, it being understood that the fish plate bolts are inserted alternately in opposite directions through the rail web and fish plates, as clearly apparent from the drawing. The block, therefore, is designed to coöperate with the nuts on the first and third securing bolts from the end of the fish plate, being centrally recessed on the inner side, as at 5, to provide for the reception of and frictional engagement with the head 6 of the bolt intermediate those carrying the nuts 3 and 4. The respective ends of the bar 1 are square to accurately engage one side surface of each of the nuts 3 and 4, the coöperation of the bar serving, of course, to secure the nuts 3 and 4 against independent turning while the bar is in applied position.

The holding member 2 is formed with a plane section 7 preferably coextensive in length and width with the relatively outer surface of the bar 1, and beyond the plane section with a spring or loop end 8 terminating in a tongue 9, as shown. The holding member is applied by inserting the tongue 9 between the web 10 and fish plate 11, preferably in the opening normally provided between these parts, being driven therein until the plane portion 7 thereof overlies and bears with spring pressure upon the block 1. Preferably the block 1 is formed or provided with rivets 12, normally projecting from its relatively outer face, and the plane portion 7 of the holding member is formed with openings to engage said rivets when the member is in applied position. After application of the holding member the rivets 12 may be upset or headed to secure the parts in applied position and prevent their separation. In this connection it is to be noted that the locking bar and holding member may be secured together by ordinary bolts, or other preferred form of fastening means in place of the rivets 12. It will thus be noted that the locking bar of my improvement coöperates with and effectively prevents accidental displacement of three bolts of the fish plate securing means, so that by the application of a nut lock on opposite sides of the rails, and at opposite ends of the fish plate connection, all of the bolts ordinarily used as a securing means for these parts are locked against independent movement.

In applied position endwise movement of the nut lock is prevented by the coöperation of the locking bar with the nuts 3 and 4 and by the engagement of the tongue 9 with the end of the fish plate, lateral movement being prevented by the frictional engagement with the tongue and also by the coöperation of the recess 5 with the head 6.

Having thus described the invention what is claimed as new, is:—

1. A nut lock for fish plate connections, comprising a locking bar to engage spaced nuts of such connection and engage and conceal the head of an intermediate connecting member, and a holding member engaging the locking bar and engaged between the fish plate and the rail web.

2. A nut lock for fish plate connections, comprising a locking bar to engage spaced nuts of such connection and engage and conceal the head of an intermediate connecting member, and a spring holding member overlying and secured to said bar throughout the length of the latter, said member having a spring tongue for engagement between the fish plate and the rail web.

3. A nut lock for fish plate connections comprising a locking bar to engage the proximate edges of spaced nuts of said connections, said bar being formed with a recess to receive the head of an intermediate connection, and a holding member secured to the locking bar, the holding member overlying and extending the full length of the locking bar, said member having a spring tongue adapted to be inserted between the fish plate and rail web.

In testimony whereof, I affix my signature in presence of two witnesses.

HARVEY T. FOWLER.

Witnesses:
 W. L. POYNTER,
 A. F. COBLE.